United States Patent
Hayashi

(10) Patent No.: US 7,889,428 B2
(45) Date of Patent: Feb. 15, 2011

(54) EXTERNAL LASER LIGHT INTRODUCING DEVICE

(75) Inventor: Shinichi Hayashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 454 days.

(21) Appl. No.: 11/396,595

(22) Filed: Apr. 4, 2006

(65) Prior Publication Data

US 2007/0081241 A1    Apr. 12, 2007

(30) Foreign Application Priority Data

Apr. 5, 2005    (JP)    ............... 2005-108992

(51) Int. Cl.
*G02B 27/10*    (2006.01)
(52) U.S. Cl. .................................... 359/618
(58) Field of Classification Search ............... 359/618; 372/31, 36, 45.01, 50.21; 250/205, 234, 250/559.36; 385/115; 430/945
See application file for complete search history.

(56) References Cited

U.S. PATENT DOCUMENTS 5,184,012 A * 2/1993 Yamamoto ............... 250/234

FOREIGN PATENT DOCUMENTS

JP         05062210 A  *  3/1993
JP         2004317676 A  *  11/2004

* cited by examiner

*Primary Examiner*—Jessica T Stultz
*Assistant Examiner*—Mahidere S Sahle
(74) *Attorney, Agent, or Firm*—Pillsbury Winthrop Shaw Pittman, LLP

(57) ABSTRACT

An external laser light introducing device is constructed to introduce laser light from outside of an optical apparatus into inside so that the laser light is condensed on a target by a condenser lens located inside the optical apparatus. In this case, the external laser light introducing device comprises a pupil projection optical system for projecting the entrance pupil of the condenser lens on an external pupil located outside the optical apparatus and an optical axis aligning mechanism for practically aligning the optical axis of the laser light with that of the external pupil.

12 Claims, 10 Drawing Sheets

Prior Art FIG.4a
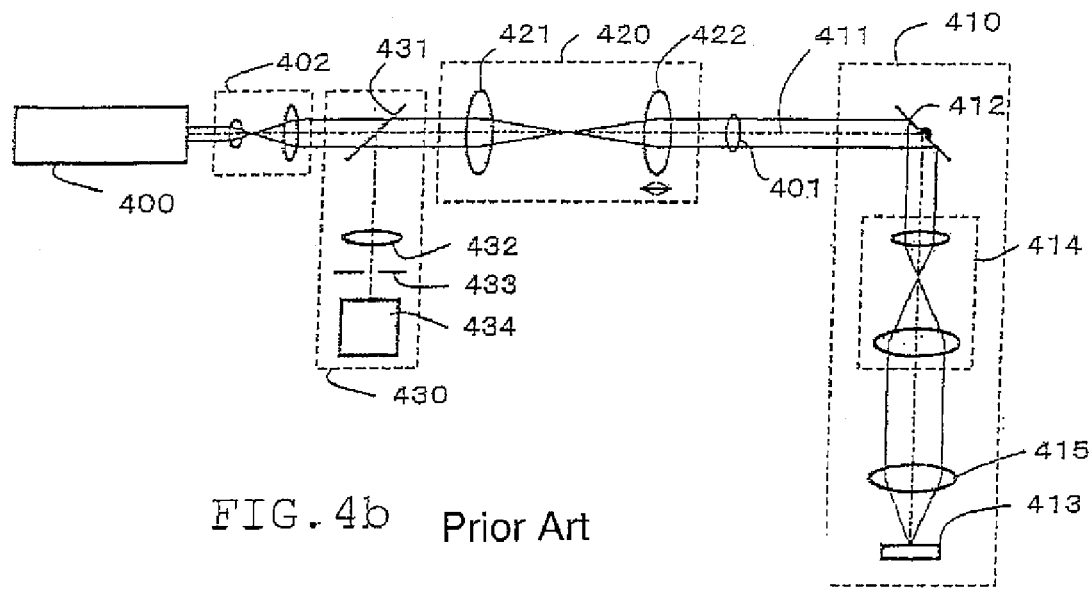
FIG.4b Prior Art
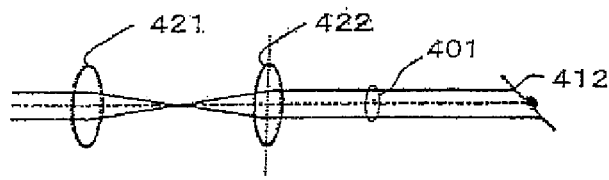
FIG.4c Prior Art
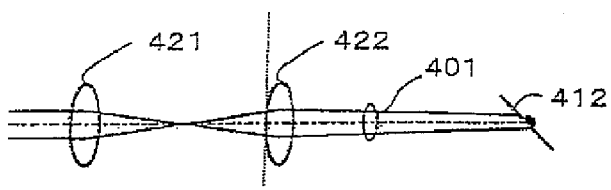
FIG.4d Prior Art
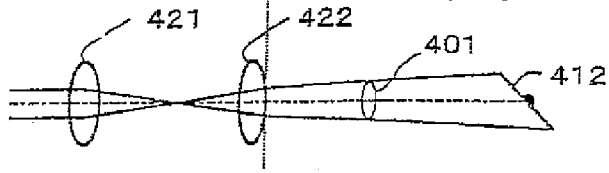

EXTERNAL LASER LIGHT INTRODUCING DEVICE

This application claims benefits of Application No. 2005-108992 filed in Japan on July 29, the contents of which are hereby incorporated by reference.

BACKGROUND OF THE INVENTION

1. Field of the Invention

This invention relates to an external laser light introducing device for making the adjustment of the optical axis of laser light introduced from the exterior of an optical apparatus.

2. Description of Related Art

Recently, in accordance with high-performance and low-cost properties of laser light sources, optical apparatuses using laser light have increased in number. For example, in the field of semiconductor manufacturing apparatuses, it is common practice to apply a process technique using laser light in an ultraviolet region, from an excimer laser, in order to increase the integration density of a semiconductor. In the field of microscopes, coherent and monochromatic properties of a laser are utilized and thereby the image of higher resolution and contrast than in the case of conventional white light illumination is obtained. Consequently, scanning laser microscopes are being popularized.

In the case where the laser light source is used in combination with such an optical apparatus, an external laser light introducing device becomes necessary which permits optical axis alignment that laser light from the laser light source is aligned with the optical axis of the optical apparatus. In particular, when it is impossible to achieve alignment by moving the laser light source itself as in the case where the laser light source is large or an oscillation condition is very delicate, the optical axis alignment must be carried out inside the external laser light introducing device.

For example, Reference 1 described below, as shown in FIG. 2a, discloses an external laser light introducing device 220 constructed with a combination of a first movable mirror 221 and a second movable mirror 222, interposed between an excimer laser light source 200 and a projection exposure apparatus 210. In this conventional example, a laser position monitor 230 including a first half mirror 231, a second half mirror 232, and a light position detector 233 are provided inside the projection exposure apparatus 210. By using this laser position monitor 230, the angles of the first movable mirror 221 and the second movable mirror 222 are adjusted so that laser light 201 emitted from the excimer laser source 200 coincides with an optical axis 211 of the projection exposure apparatus 210, and thereby the optical axis alignment of the laser light 201 is carried out.

Reference 2 described below, as shown in FIG. 3, discloses an external laser light introducing device 320 that combines a movable lens 321, a fixed lens 322, and a movable plane-parallel plate 323, arranged on an optical axis 311 of an optical apparatus. In this conventional example, a laser light parallel control device 330 including a first beam splitter 331, a second beam splitter 332, a first light position detector 333, a second light position detector 334, and a lens driving circuit 335, interposed between the movable lens 321 and the fixed lens 322, performs the function of converging laser light 301 at the front focus position of the fixed lens 322 by moving the movable lens 321 along the optical axis 311. The fixed lens 322 performs the function of making the laser light 301 emerge parallel with the optical axis 311. A laser light position control device 336 including a third beam splitter 337, a third light position detector 338, and a plane-parallel plate driving circuit 339, provided behind the fixed lens 322, performs the function of making the laser light 301 emerging from the external laser light introducing device 320 coincide with optical axis 311 by adjusting an inclination relative to the optical axis 311 of the movable plane-parallel plate 323.

In the external laser light introducing device, the function of the focus position adjustment of the laser light is sometimes needed. Reference 3 described below, as shown in FIG. 4a, discloses a scanning laser microscope including a laser light source 400, a first beam expander 402, a microscope body 410, a focus position control optical system 420, and a confocal detector 430. In the microscope body 410, an objective lens 415 for magnifying and observing a specimen 413, a galvanomirror 412, and a second beam expander 414 connecting the position of the entrance pupil of the objective lens 415 and the galvanomirror 412 as a conjugate relation and fitting the diameter of the beam of laser light 401 to that of the entrance pupil of the objective lens 415 are arranged. The laser light 401 incident on the microscope body 410 along an optical axis 411, after being reflected by the galvanomirror 412 to pass through the second beam expander 414, enters the pupil of the objective lens 415 and is converged on the specimen 413. By oscillating the galvanomirror 412 to change the angle, the specimen 413 is scanned with the laser light 401 converged thereon. Reflected light, scattered light, or emitted light produced at the convergence position of the laser light 401 on the specimen 413 travels along the same optical path as the laser light 401 in a reverse direction, and a confocal image is detected by the confocal detector 430 including a beam splitter 431, a confocal lens 432, a confocal pinhole 433, and a photomultiplier tube 434. In the focus position control optical system 420 located on the optical path between the confocal detector 430 and the microscope body 410, a fixed convex lens 421 and a movable convex lens 422 constitute a nearly afocal system. The movable convex lens 422 can be moved along the optical axis to change the convergence or divergence of the laser light emerging from the focus position control optical system 420. Whereby, the height of convergence of the laser light 401 in the specimen 413 is changed and the focus position adjustment is carried out. The focus position control optical system 420 is also a kind of external laser light introducing device.

In a laser microscope having a plurality of laser light sources such as that disclosed in Reference 4 described below, when the laser light sources are switched or used at the same time, it is required that beams of laser light from the plurality of laser light sources to be focused on a specimen are converged at a point. In this case, on the basis of the light-collecting position of a laser light source as a reference, the optical axis alignment of laser light from each of the other laser light sources is carried out and at the same time, the focus position adjustment must be arbitrarily made.

Reference 1: Japanese Patent Kokai No. Hei 5-217844
    Reference 2: Japanese Patent Kokai No. Hei 5-62210
    Reference 3: Japanese Patent Kokai No. 2004-317676
    Reference 4: Japanese Patent Kokai No. 2003-57554

In conventional external laser light introducing devices, in order to make laser light coincide with the optical axis, it is necessary that the laser light is made to coincide with the optical axis at a reference point in the optical apparatus and the direction in which the laser light emerges at the reference point is made parallel with the optical axis.

For example, in the example of Reference 1, the light position detector 233 of the laser position monitor 230 corresponds to the reference point mentioned above. The direction in which the laser light emerges at the reference point is aligned with the optical axis in such a way that the return light of the laser light 201 caused by specular reflection from the second half mirror 232 of the laser position monitor 230 is superimposed with the laser light 201 in the proximity of the exit port of the excimer laser light source 200. However, when either the first movable mirror 221 or the second movable mirror 222 of the external laser light introducing device 220 is moved, both the position and the angle of the laser light 201 at the light position detector 233 are changed. Thus, the optical axis alignment needs alternate and repeated adjustments of the first movable mirror 221 and the second movable mirror 222.

The specific procedure of such adjustments is as follows. As illustrated in FIG. 2b, first, the first movable mirror 221 is adjusted so that the laser light 201 strikes the center of the second movable mirror 222 (Step 252), and the second movable mirror 222 is adjusted so that the laser light 201 strikes the center of the light position detector 233 (Step 253). Subsequently, a sheet of paper is put in the proximity of the exit port of the excimer laser light source 200 and the position of the return light specularly reflected by the second half mirror 232 of the laser position monitor 230 is viewed (Step 254) to ascertain whether the return light is axially aligned with the laser light 201 (Step 255). Here, if the return light is not axially aligned with the laser light 201, the first movable mirror 221 is adjusted so that the return light is superimposed with the laser light 201 (Step 256), and the procedure from Step 253 is repeated.

The example of Reference 2 is based on a major premise that the optical axis of the external laser light introducing device 320 and the optical axis 311 coincide with each other. However, it is very difficult to make invisible optical axes coincide. Common practice involves the operation that laser light for alignment is introduced along the optical axis 311 of the optical apparatus and the laser light for alignment is used to align the optical axis of the external laser light introducing device 320 with the optical axis 311.

Using FIGS. 4b-4d, the example of Reference 3 will be explained below. The movable convex lens 422 of the focus position control optical system 420, as shown in FIG. 4b, is set so that in the initial state, the laser light 401 emerging from the focus position control optical system becomes a parallel beam. In this case, the galvanomirror 412 of the microscope body is such that the beam of a proper diameter is incident thereon. In laser microscopes commercially available, however, a distance from the entrance port of the laser light to the galvanomirror is long, and when the movable convex lens 422 is moved away from the fixed convex lens 421 along the optical axis in order to shift upward the focusing position on the specimen, the laser light 401 emerging from the external laser light introducing device becomes convergent light and the beam diameter of the laser light 401 on the galvanomirror 412 becomes smaller than its proper value. Consequently, the laser light 401 ceases to meet the pupil diameter at the position of the entrance pupil of the objective lens, and thus the resolution of a confocal image obtained is deteriorated. On the other hand, when the movable convex lens 422 is moved toward the fixed convex lens 421 along the optical axis in order to shift downward the focusing position on the specimen, the laser light 401 emerging from the focus position control optical system becomes divergent light and the beam diameter of the laser light 401 on the galvanomirror 412 becomes larger than its proper value. Consequently, part of the laser light 401 is eclipsed at the galvanomirror 412 or the entrance pupil of the objective lens, and the amount of light is reduced. For example, when the wavelength of the laser light is 488 nm, the beam diameter of the laser light 401 emerging from the focus position control optical system is 3 mm, a distance from the focus position control optical system to the galvanomirror 412 is 1 m, and tolerances of variations of the beam diameter of the laser light 401 on the galvanomirror 412 are ±10%, it is seen from a simple calculation that the distance of the shift of the focusing position is limited to the degree of the depth of focus. That is, there is the problem that the focusing position cannot be substantially shifted.

SUMMARY OF THE INVENTION

In the external laser light introducing device according to the present invention, laser light is introduced from outside of an optical apparatus into inside and the laser light is condensed on a target by a condenser lens located inside the optical apparatus. In this case, the external laser light introducing device comprises a pupil projection optical system for projecting the entrance pupil of the condenser lens on an external pupil located outside the optical apparatus and an optical axis aligning mechanism for practically aligning the optical axis of the laser light with that of the external pupil.

In the external laser light introducing device according to the present invention, the optical axis aligning mechanism includes an optical axis position adjusting mechanism for making the position of the optical axis of the laser light practically coincide with the center of the external pupil and an optical axis angle adjusting mechanism for making the optical axis of the external pupil practically coincide with the angle of the optical axis of the laser light after the position of the optical axis of the laser light is made to practically coincide with the center of the external pupil by the optical axis position adjusting mechanism.

The external laser light introducing device according to the present invention further comprises a wavefront curvature adjusting mechanism for adjusting the wavefront curvature of the laser light at the position of the external pupil.

The external laser light introducing device according to the present invention further comprises a plurality of optical axis aligning mechanisms for aligning optical axes of a plurality of beams of laser light with the optical axis of the external pupil and a beam combiner for combining the plurality of beams of laser light to introduce the laser light into the entrance pupil.

The external laser light introducing device according to the present invention further comprises a plurality of wavefront curvature adjusting mechanisms for adjusting wavefront curvatures of a plurality of beams of laser light at the external pupil.

The external laser light introducing device according to the present invention further comprises an optical axis position detector for detecting the position of incidence of the laser light at the external pupil.

The external laser light introducing device according to the present invention further comprises an optical axis position feedback device driving the optical axis position adjusting mechanism by using an output from the optical axis position detector.

The external laser light introducing device according to the present invention further comprises an optical axis angle detector for detecting the angle of incidence of the laser light at the external pupil.

The external laser light introducing device according to the present invention further comprises an optical axis angle feedback device driving the optical axis angle adjusting mechanism by using an output from the optical axis angle detector.

In the external laser light introducing device according to the present invention, laser light is introduced from outside of an optical apparatus into inside so that the laser light is condensed on a target by a condenser lens located inside the optical apparatus. In this case, the external laser light introducing device comprises a pupil projection optical system for projecting the entrance pupil of the condenser lens on an external pupil located outside the optical apparatus and a wavefront curvature adjusting mechanism for adjusting the wavefront curvature of the laser light at the position of the external pupil.

In a method of introducing external laser light according to the present invention, laser light is introduced from outside of an optical apparatus into inside so that the laser light is condensed on a target by a condenser lens located inside the optical apparatus. In this case, the entrance pupil of the condenser lens is projected on an external pupil located outside the optical apparatus and a wavefront curvature adjusting mechanism is used to adjust the wavefront curvature of the laser light at the position of the external pupil.

A laser microscope apparatus according to the present invention comprises a laser light source emitting laser light, a microscope body including an objective lens for magnifying and observing a specimen, and an external laser light introducing device introducing the laser light into the microscope body. In this case, the external laser light introducing device includes a pupil projection optical system for projecting the entrance pupil of the objective lens on an external pupil of the microscope body and a wavefront curvature adjusting mechanism for adjusting the wavefront curvature of the laser light at the position of the external pupil.

These and other features and advantages of the present invention will become apparent from the following detailed description of the preferred embodiments when taken in conjunction with the accompanying drawings.

BRIEF DESCRIPTION OF THE DRAWINGS

FIG. 4a is a view explaining the structure of still another example of the conventional external laser light introducing device;

FIGS. 4b, 4c, and 4d are views explaining the adjustment of the focal point by the conventional external laser light introducing device;

DETAILED DESCRIPTION OF THE PREFERRED EMBODIMENTS

The aspects of the external laser light introducing device of the present invention and their functions and effects will first be described.

Figure 1A:
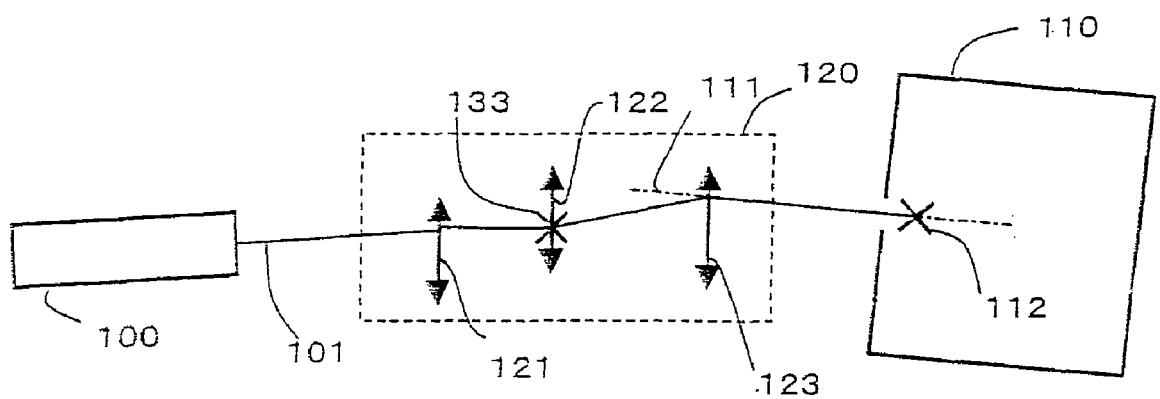
FIG. 1a is a view showing the structure of the external laser light introducing device of the present invention.

In the external laser light introducing device of the present invention, as shown in FIG. 1a with respect to its structure, an external laser light introducing device 120 is such that laser light 101 is introduced from outside of an optical apparatus 110 into inside and the laser light 101 is condensed on a target by a condenser lens located inside the optical apparatus 110. In this case, the external laser light introducing device 120 comprises a pupil projection optical system 123 for projecting an entrance pupil 112 of the condenser lens on an external pupil 133 located outside the optical apparatus 110 and an optical axis aligning mechanism for practically aligning the optical axis of the laser light 101 with that of the external pupil 133.

In the present invention, the entrance pupil 112 of the condenser lens in the optical apparatus 110 is projected on the external pupil 133 outside the optical apparatus 110 by the pupil projection optical system 123. Whereby, the adjustments of the position and angle of the laser light 101 at the entrance pupil 112 can also be made at the external pupil 133, and thus the adjustment of the optical axis of the laser light 101, in contrast with a conventional practice, can be very simply made.

Also, although it is described here that the entrance pupil inside the optical apparatus is projected on the external pupil outside it, it is needless to say that, even with the expression that the external pupil is projected on the entrance pupil inside the optical apparatus, its actual meaning is unchanged.

In one preferred aspect of the present invention, the optical axis aligning mechanism includes an optical axis position adjusting mechanism 121 for making the position of the optical axis of the laser light 101 practically coincide with the center of the external pupil 133 and an optical axis angle adjusting mechanism 122 for making the optical axis of the external pupil 133 and the angle of the optical axis of the laser light 101 practically coincide after the position of the optical axis of the laser light 101 is made to practically coincide with the center of the external pupil 133 by the optical axis position adjusting mechanism 121.

Figure 1B:
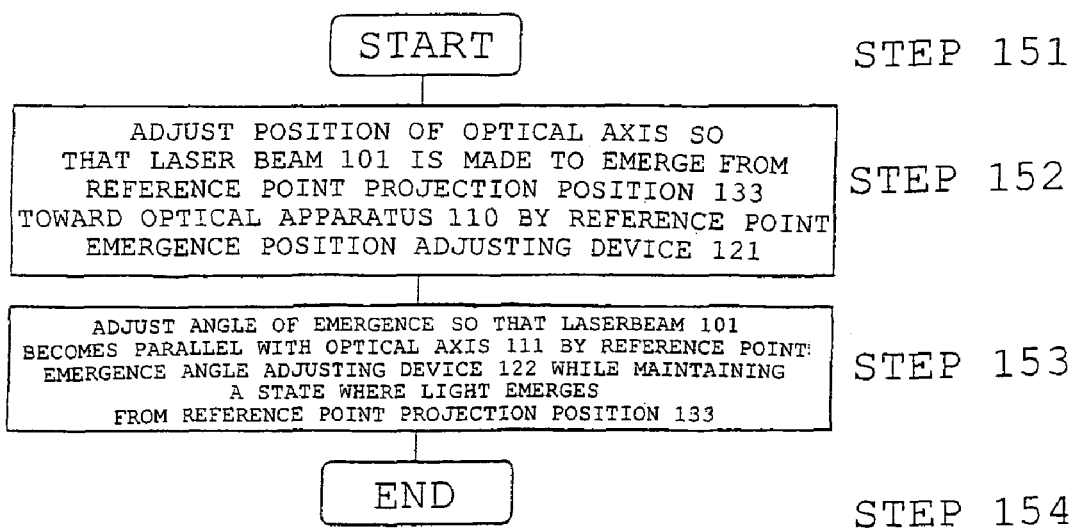
FIG. 1b is a flow chart illustrating the procedure of the adjustment of the optical axis of the external laser light introducing device of the present invention.
Figure 2A:
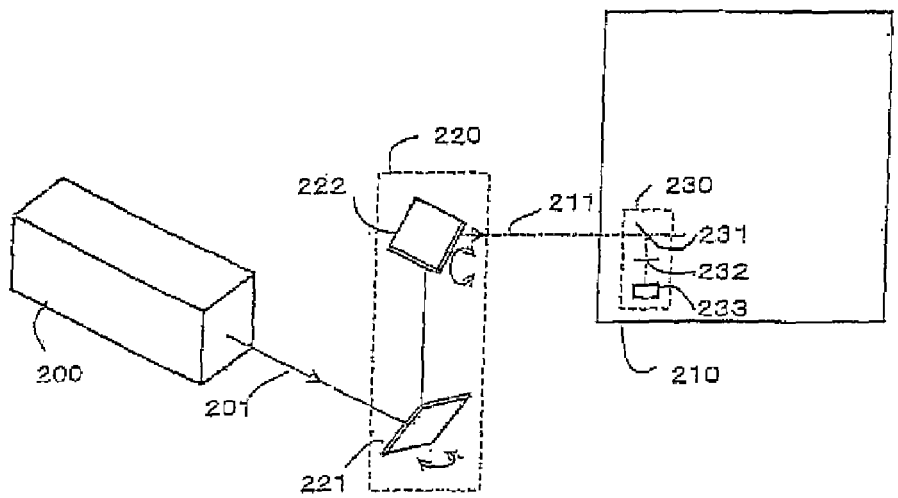
FIG. 2a is a view explaining the structure of an example of a conventional external laser light introducing device.
Figure 2B:
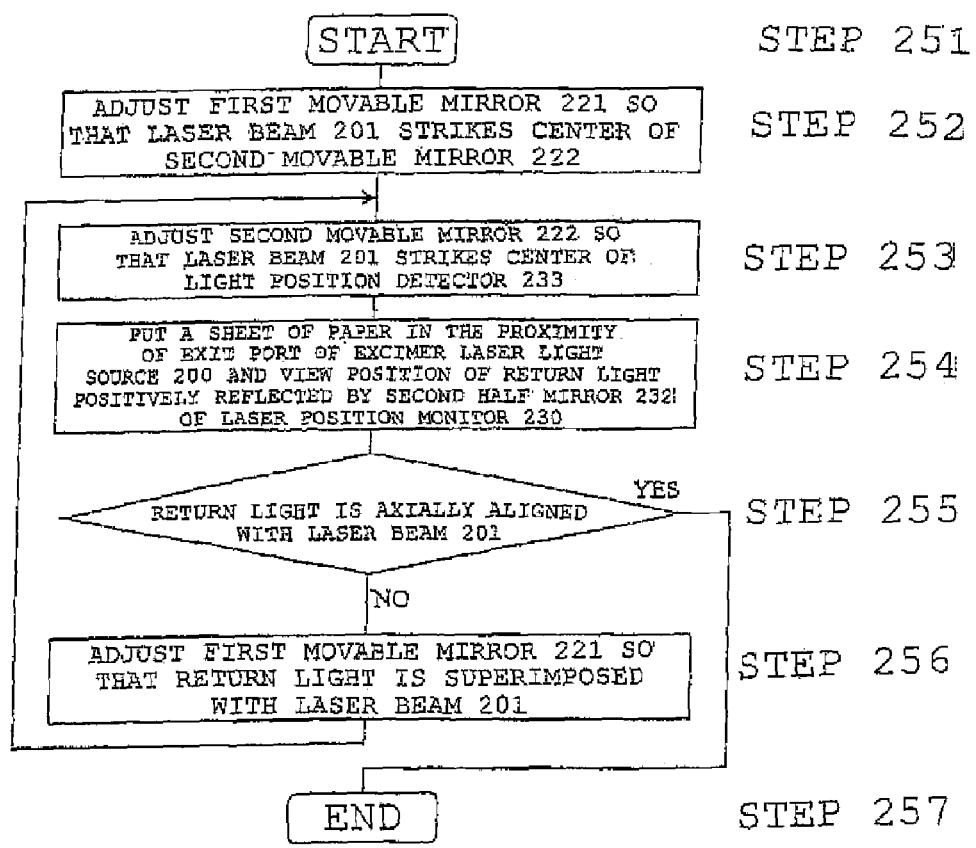
FIG. 2b is a flow chart illustrating the procedure of the adjustment of the optical axis in an example of the conventional external laser light introducing device.
Figure 3:
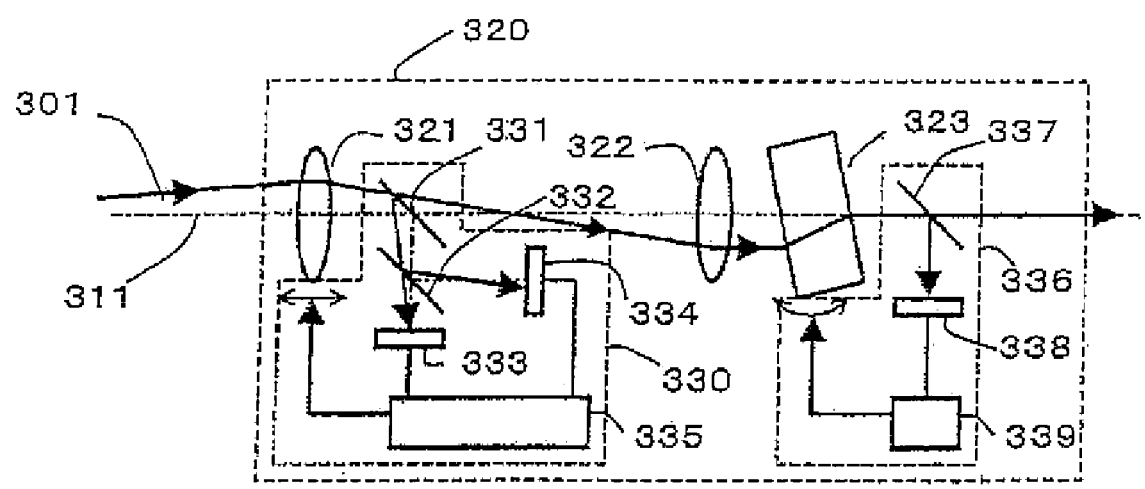
FIG. 3 is a view explaining the structure of another example of the conventional external laser light introducing device.

In this aspect, since the optical axis of the external pupil 133 is made to practically coincide with the angle of the optical axis of the laser light 101 after the position of the optical axis of the laser light 101 is made to practically coincide with the center of the external pupil 133 by the optical axis position adjusting mechanism 121, the optical axis alignment can be very simply performed. In FIG. 1b showing the procedure of this operation, the position of the optical axis is first adjusted so that the laser light 101 is made to emerge from the center of the external pupil 133 toward the optical apparatus 110 by the optical axis position adjusting mechanism 121 with respect to an optical axis 111 of the optical apparatus 110 and the laser light 101 of a laser light source 100 that has the optical axis of different position and angle in an initial state (Step 152). Subsequently, by the optical axis angle adjusting mechanism 122, the angle of the optical axis is adjusted so that the laser light 101 becomes parallel with the optical axis 111 of the optical apparatus while maintaining a state where the light emerges from the center of the external pupil 133 (Step 153). Whereby, the optical axis alignment of the laser light 101 with the optical axis 111 of the optical apparatus 110 is completed. For example, in the case of the laser microscope, it is good practice to first adjust the position of the optical axis by using the optical axis position adjusting mechanism so that the laser light is incident on the center of the entrance pupil of the objective lens and then, to adjust the angle of the optical axis by using the optical axis angle adjusting mechanism so that the laser light is focused at a desired position on the specimen. In this aspect, as mentioned above, there is no trouble relative to the adjustment of the optical axis, such as occurs in a conventional operation that, for example, the adjustments of the angles of two mirrors are repeated. Thus, when the present invention is used, it is possible to perform very simply and rapidly the optical axis alignment of the laser light that formerly has involved difficulty and required much time.

In one preferred aspect of the present invention, the wavefront curvature adjusting mechanism for adjusting the wavefront curvature of the laser light at the position of the external pupil is provided.

This aspect is such that the wavefront curvature of the laser light can be adjusted at the position of the external pupil located outside the optical apparatus. At the position of the external pupil, it is easy to largely change the wavefront curvature without changing the optical axis of the laser light or changing the beam diameter of the laser light. Consequently, even at the entrance pupil projected on the external pupil, it becomes possible to adjust the wavefront curvature over a wide range in such a way that the optical axis of the laser light is not changed or the beam diameter of the laser light is not changed, and the range of the adjustment of a light-collecting position in the target can be enlarged.

In one preferred aspect of the present invention, a plurality of optical axis aligning mechanisms for aligning optical axes of a plurality of beams of laser light with the optical axis of the external pupil and a beam combiner for combining the plurality of beams of laser light to introduce the laser light into the entrance pupil are provided.

In this aspect, the optical axis alignment at the external pupil can be independently performed with respect to the plurality of beams of laser light, and hence the optical axes of the plurality of beams of laser light can be made to coincide very easily in the optical apparatus.

In one preferred aspect of the present invention, a plurality of wavefront curvature adjusting mechanisms for adjusting wavefront curvatures of a plurality of beams of laser light individually at the external pupil are provided.

In this aspect, the wavefront curvature at the external pupil can be independently adjusted with respect to the plurality of beams of laser light, and hence the light-collecting positions of the plurality of beams of laser light can be made to coincide very easily on the target.

In one preferred aspect of the present invention, the optical axis position detector for detecting the position of incidence of the laser light at the external pupil is provided.

In this aspect, the amount of adjustment necessary for the optical axis position adjustment can be calculated using an output from the optical axis position detector, and the optical axis position adjustment can be rapidly completed.

In one preferred aspect of the present invention, the optical axis position feedback device driving the optical axis position adjusting mechanism by using an output from the optical axis position detector is provided.

In this aspect, the optical axis position adjustment can be performed dynamically by the optical axis position feedback device, and thus even when the shift of the position of the optical axis of the laser light is caused by changes in the environment, changes in property with time, or a change of an oscillation condition, the optical axis position adjustment can be made in real time.

In one preferred aspect of the present invention, the optical axis angle detector for detecting the angle of incidence of the laser light at the external pupil is provided.

In this aspect, the amount of adjustment necessary for the optical axis angle adjustment can be calculated using an output from the optical axis angle detector, and the optical axis angle adjustment can be rapidly completed.

In one preferred aspect of the present invention, the optical axis angle feedback device driving the optical axis angle adjusting mechanism by using an output from the optical axis angle detector is provided.

In this aspect, the optical axis angle adjustment can be performed dynamically by the optical axis angle feedback device, and thus even when the shift of the angle of the optical axis of the laser light is caused by changes in the environment, changes in property with time, or a change of an oscillation condition, the optical axis angle adjustment can be made in real time.

In the external laser light introducing device of the present invention, laser light is introduced from outside of an optical apparatus into inside so that the laser light is focused on a target by a condenser lens located inside the optical apparatus. In this case, the external laser light introducing device comprises a pupil projection optical system for projecting the entrance pupil of the condenser lens on an external pupil located outside the optical apparatus and a wavefront curvature adjusting mechanism for adjusting the wavefront curvature of the laser light at the position of the external pupil.

In the present invention, the entrance pupil of the condenser lens located inside the optical apparatus is projected on the external pupil outside the optical apparatus by the pupil projection optical system so that the wavefront curvature of the laser light can be adjusted at the position of the external pupil. At the position of the external pupil, it is easy to change the wavefront curvature without changing the optical axis of the laser light or changing the beam diameter of the laser light. Consequently, even at the entrance pupil projected on the external pupil, it becomes possible to adjust the wavefront curvature over a wide range in such a way that the optical axis of the laser light is not changed or the beam diameter of the laser light is not changed, and the range of the adjustment of a focusing position in the target can be enlarged.

In accordance with the drawings, the embodiments of the present invention will be described below.

Embodiment 1

Reference is made to the external laser light introducing device of Embodiment 1 according to the present invention.

Figure 5A:
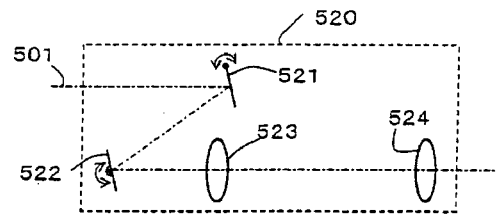
FIG. 5a is a view explaining the structure of the external laser light introducing device of Embodiment 1 in the present invention.

The external laser light introducing device of Embodiment 1 according to the present invention, as shown in FIG. 5a, comprises a kinematic movable mirror 521, a gimbaled movable mirror 522, a first convex lens 523, and a second convex lens 524. The first convex lens 523 and the second convex lens 524 are arranged on the same axis in a state where the back focus position of the first convex lens 523 is made to coincide with the front focus position of the second convex lens 524, and constitute an afocal imaging system. The gimbaled movable mirror 522 is located at the front focus position of the first convex lens 523.

In this embodiment, the afocal imaging system composed of the first convex lens 523 and the second convex lens 524 functions as a pupil projection optical system in which an entrance pupil 512 in the optical apparatus is projected at the center of rotation of the gimbaled movable mirror 522. Since the afocal imaging system makes an incident parallel beam emerge as a parallel beam, this is convenient for transmission of the laser light. The kinematic movable mirror 521 is capable of adjusting the position of incident laser light 501 irradiating the gimbaled movable mirror 522 by changing its inclination and therefore, functions as the optical axis position adjusting mechanism at the external pupil. The gimbaled movable mirror 522 functions as the optical axis angle adjusting mechanism at the external pupil by changing its inclination.

Figure 5B:
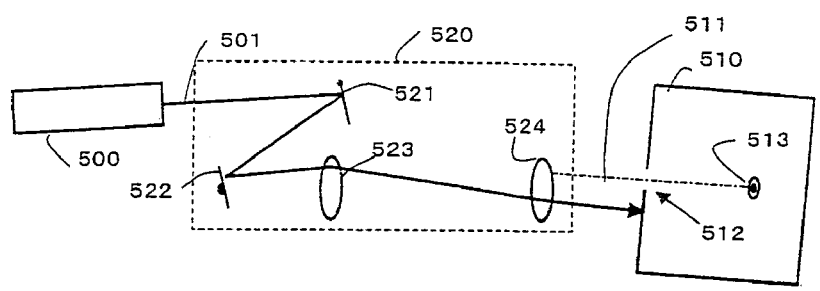
FIGS. 5b, 5c, and 5d are views explaining the procedure of the adjustment of the optical axis in the external laser light introducing device of Embodiment 1 of the present invention.

With reference to FIGS. 5b-5d and FIG. 5e, a description is given of the procedure that in the use of an external laser light introducing device 520 of the embodiment, the laser light 501 emitted from a laser light source 500 is introduced into an optical apparatus 510 to perform the optical axis alignment. First, the external laser light introducing device 520 is positioned so that the back focus position of the second convex lens 524 and the entrance pupil 512 of a condenser lens in the optical apparatus 510 practically coincide and an optical axis 511 of the optical apparatus 510 roughly coincides with the optical axis of the external laser light introducing device (Step 552). The gimbaled movable mirror 522 is located at the position where the center of its rotation is conjugate with that of the entrance pupil 512 (Step 553). Next, the kinematic movable mirror 521 of the external laser light introducing device 520 is located at a proper position on the optical path of the laser light 501 from the laser light source 500 (Step 554). In a state at this time, as shown in FIG. 5b, the laser light 501 deviates from the entrance pupil 512 and is not properly introduced into the optical apparatus 510.

Figure 5C:
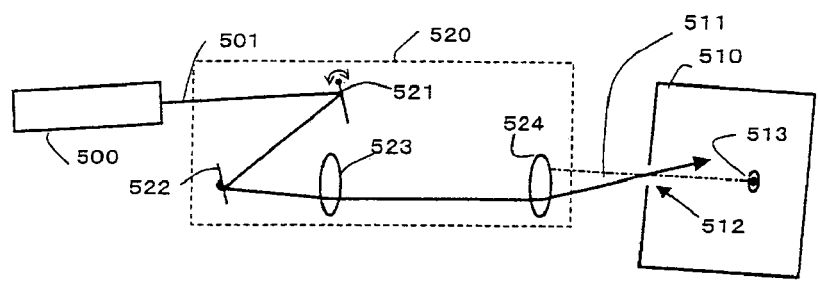
Figure 5D:
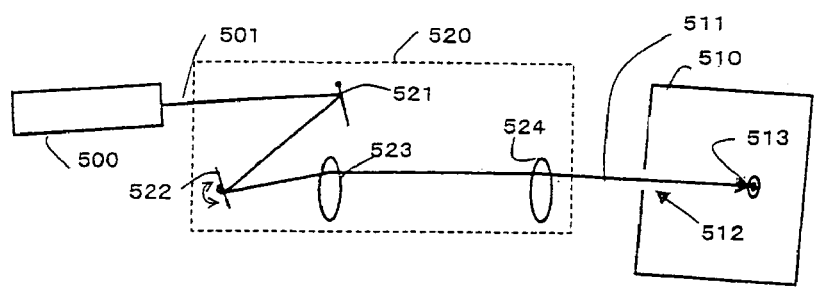
Figure 5E:
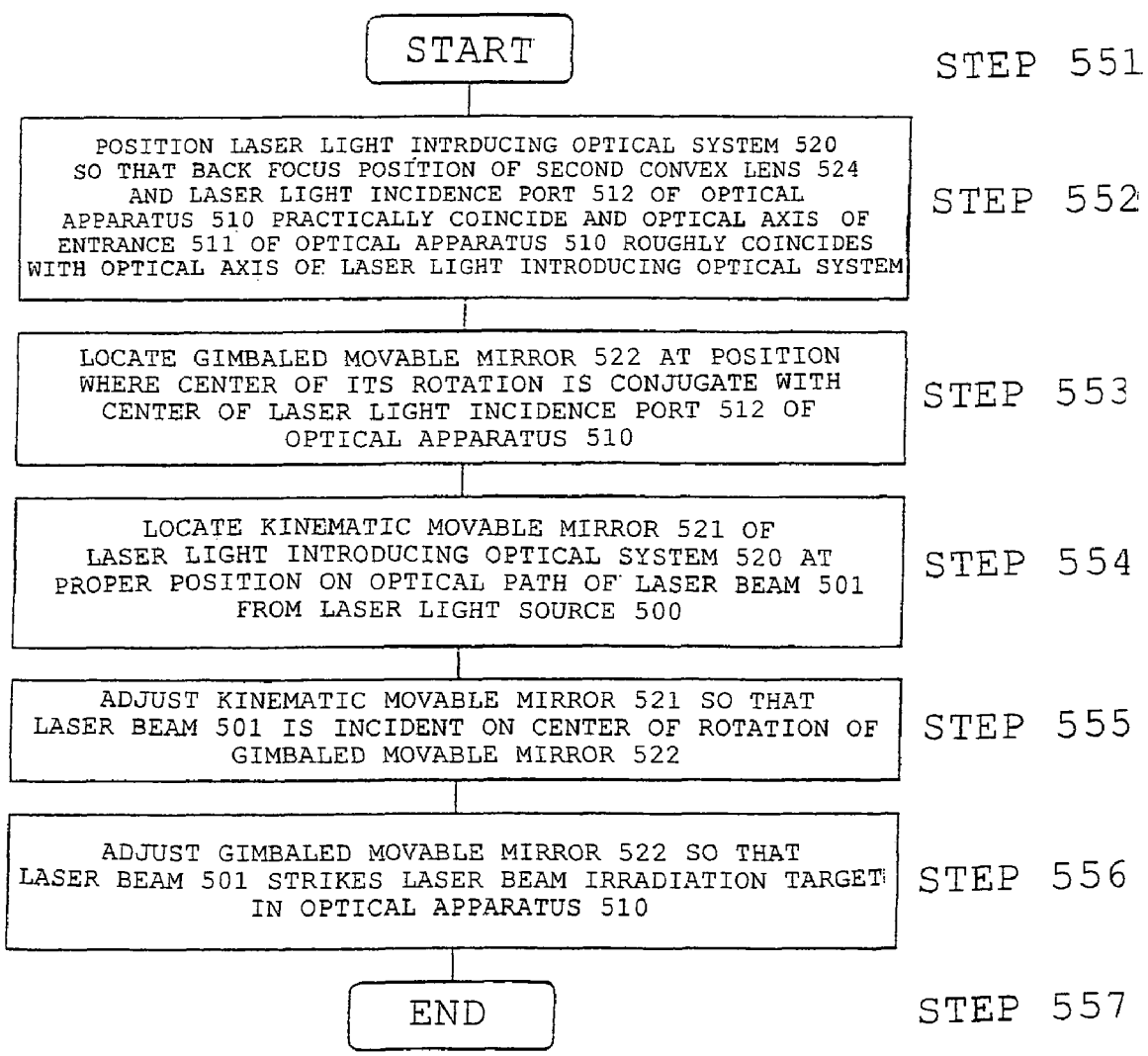
FIG. 5e is a flow chart illustrating the procedure of the adjustment of the optical axis in the external laser light introducing device of Embodiment 1 of the present invention.

Subsequently, as shown in FIG. 5c, the kinematic movable mirror 521 is adjusted so that the laser light 501 is incident on the center of rotation of the gimbaled movable mirror 522 (Step 555). The center of rotation of the gimbaled movable mirror 522 is conjugate with that of the entrance pupil 512, and thus when a state where the laser light 501 is incident on the center of rotation of the gimbaled movable mirror 522 is brought about, the laser light 501 is also incident automatically on the center of the entrance pupil 512. When the optical apparatus is such as to look through the entrance pupil 512 directly, the adjustment of the kinematic movable mirror 521 can be completed with ease and in a short time. Finally, as shown in FIG. 5d, the inclination of the gimbaled movable mirror 522 is adjusted so that the laser light 501 strikes a target 513 in the optical apparatus 510 (Step 556). The center of rotation of the gimbaled movable mirror 522 is located at the position nearly conjugate with the entrance pupil 512, and hence even when the angle of the gimbaled movable mirror 522 is changed, the position of the laser light 501 irradiating the entrance pupil 512 of the optical apparatus is not virtually shifted. As such, at the time the laser light 501 strikes the target 513, the laser light 501 is aligned with the optical axis 511 of the optical apparatus 510 and the optical axis alignment is completed.

Figure 9A:
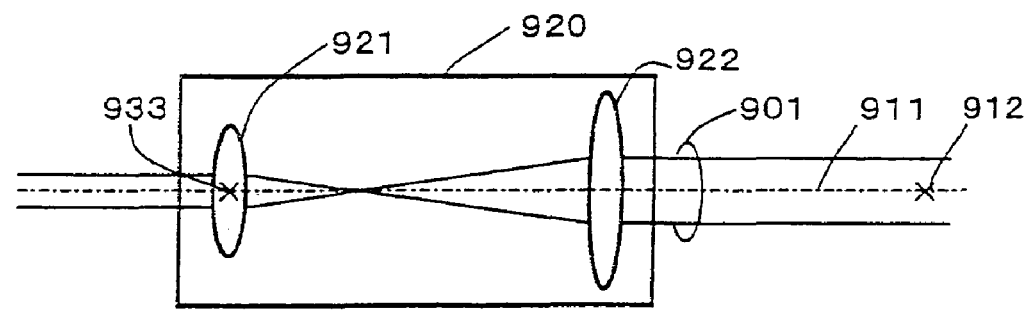
FIGS. 9a, 9b, and 9c are views explaining the structure of a further example of the external laser light introducing device of Embodiment 1 in the present invention.
Figure 9B:
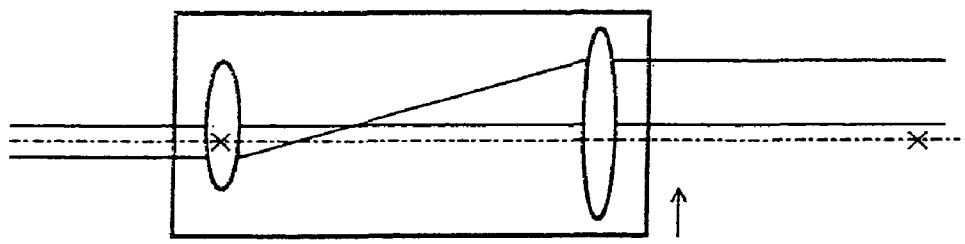
Figure 9C:
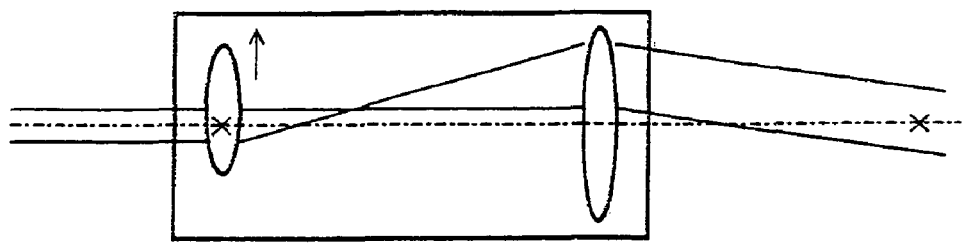

Also, as shown in FIGS. 9a-9c, even when mirrors are not used and lenses are moved, the same optical axis alignment can be achieved. An optical axis aligning mechanism constitutes an afocal system in which the back focus position of a first convex lens 921 is made to coincide with the front focus position of a second convex lens 922. The optical axis aligning mechanism is located so that a projection position 933 of an external pupil 912 held by the second convex lens 922 lies at the center of the first convex lens 921. As shown in FIG. 9b, the movement of the entire optical axis aligning mechanism in a direction perpendicular to the optical axis allows the position of the optical axis of laser light 901 at the external pupil 912 to be shifted and thus functions as the optical axis position adjusting mechanism. The movement of the first convex lens 921 alone in a direction perpendicular to the optical axis allows the angle of the optical axis of the laser light 901 at the reference point 912 to be changed without altering the position of the optical axis and thus functions as the optical axis angle adjusting mechanism.

As mentioned above, when Embodiment 1 of the present invention is used, the optical axis alignment of the laser light can be achieved with great ease and in a short time.

Embodiment 2

The laser microscope of Embodiment 2 according to the present invention will be explained below.

Figure 6A:
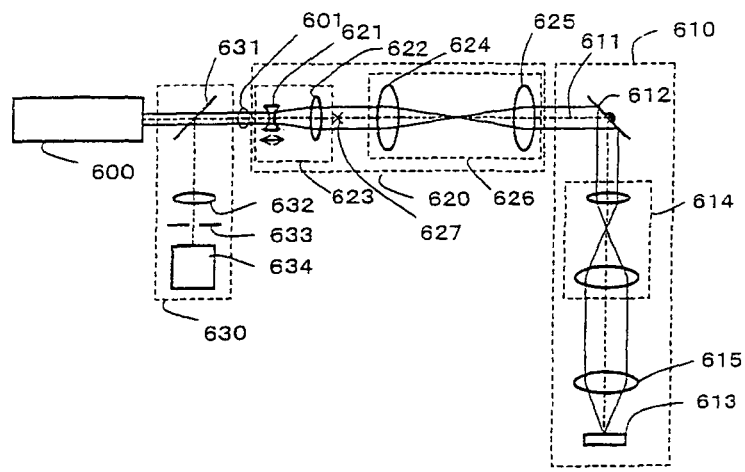
FIG. 6a is a view explaining the structure of a laser microscope of Embodiment 2 in the present invention.

The laser microscope of Embodiment 2 according to the present invention, as shown in FIG. 6a, comprises a laser light source 600, a microscope body 610, a focus position control optical system 620, and a confocal detector 630. The microscope body 610 includes an objective lens 615 for focusing laser light 601 emitted from the laser light source 600 on a specimen 613, a galvanomirror 612, and a second beam expander 614 connecting the position of the entrance pupil of the objective lens 615 and the galvanomirror 612 in conjugate relation and fitting the beam diameter of the laser light 601 to the diameter of the entrance pupil of the objective lens 615. The laser light 601 incident on the microscope body 601 along an optical axis 611, after being reflected by the galvanomirror 612 and passing through the second beam expander 614, is incident on the pupil position of the objective lens 615 and is focused on the specimen 613. By oscillating the galvanomirror 612 to change the angle, the position of the optical axis of the laser light 601 at the entrance pupil of the objective lens 615 is fixed and at the same time, the position of the laser light 601 focused on the specimen 613 is scanned. Reflected light, scattered light, or emitted light produced at the focusing position of the laser light 601 on the specimen 613 travels along the same optical path as the laser light 601 in a reverse direction and is detected by the confocal detector 630 including a beam splitter 631, a confocal lens 632, a confocal pinhole 633, and a photomultiplier tube 634, and a confocal image is produced. The focus position control optical system 620 located on the optical path between the confocal detector 630 and the microscope body 610 includes a first beam expander 623 and a pupil projection optical system 626. In the pupil projection optical system 626, a second convex lens 624 and a third convex lens 625 constitute a nearly afocal system, and the back focus position of the third convex lens 625 is located at the center of the galvanomirror 612. At the front focus position of the second convex lens 624, an external pupil 627 conjugate with the galvanomirror 612 is located. In the first beam expander 623, a movable concave lens 621 and a first convex lens 622 constitute a nearly afocal system, and the back focus position of the first convex lens 622 is located so as to coincide with the external pupil 627.

The movable concave lens 621 can be moved along the optical axis and is capable of adjusting the wavefront curvature at the external pupil 627 without changing the beam diameter of the laser light 601 at this point. The external pupil 627 is conjugate with the position of the entrance pupil of the objective lens 615, and even when the movable concave lens 621 is moved, the beam diameter at the position of the entrance pupil of the objective lens 615 is not changed. Therefore, the movable concave lens 621 is moved along the optical axis to change the convergence or divergence of the laser light 601 leaving the focus position control optical system 620, and thereby the height of focusing of the laser light 601 on the specimen 613 is changed so that when the focus position adjustment is made, the degradation of resolution and a reduction of the amount of light are not caused.

Figure 6B:
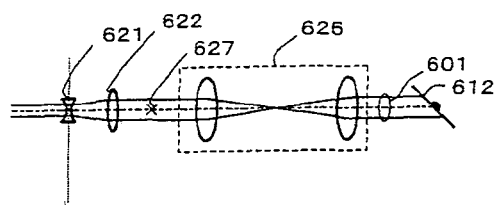
FIGS. 6b, 6c, and 6d are views explaining the adjustment of the focal point by the laser microscope of Embodiment 2 in the present invention.
Figure 6C:
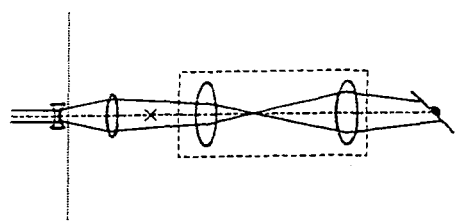
Figure 6D:
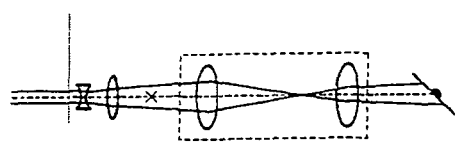

The above description will be given in more detail with reference to FIGS. 6b-6d. In this embodiment, the movable concave lens 621 of the focus position control optical system, as shown in FIG. 6b, is set by the design so that the laser light 601 emerging from the focus position control optical system becomes a parallel beam and in this case, a beam with proper diameter is incident on the galvanomirror 612 of the microscope body. As shown in FIG. 6c, when the movable concave lens 621 is moved away from the first convex lens 622 along the optical axis in order to shift upward the focus position on the specimen, the laser light 601 emerging from the external laser light introducing device becomes convergent light. However, the beam diameter of the laser light 601 on the galvanomirror 612 located at the position conjugate with the back focus position of the first convex lens 622 remains unchanged. Thus, since no change also occurs in the beam diameter of the laser light 601 at the position of the entrance pupil of the objective lens, it is avoidable that the resolution of a confocal image obtained is degraded as in conventional practice. On the other hand, as shown in FIG. 6d, even when the movable concave lens 621 is moved close to the first convex lens 622 along the optical axis in order to shift downward the focus position on the specimen, the laser light 601 emerging from the external laser light introducing device becomes divergent light, but there is no change in the diameter of the laser light 601 on the galvanomirror 612. Hence, the disadvantage that the amount of light is reduced is not caused.

Moreover, in the embodiment, the external pupil 627 conjugate with the galvanomirror 612 is formed inside the focus position control optical system 620 to control the wavefront curvature of the laser light 601 at the external pupil 627. Whereby, the focus position adjustment can be made by the distance adjustment of the first beam expander and therefore, there is the merit that the optical system for the focus position adjustment can be constructed to be compact, As mentioned above, when Embodiment 2 of the present invention is used, the degradation of resolution and a reduction of the amount of light are not caused even in the focus position adjustment made by the external laser light introducing device, and thus an adjustable range of the focus position can be enlarged.

Embodiment 3

The dual-wavelength excitation laser microscope of Embodiment 3 according to the present invention will be explained below.

Figure 7:
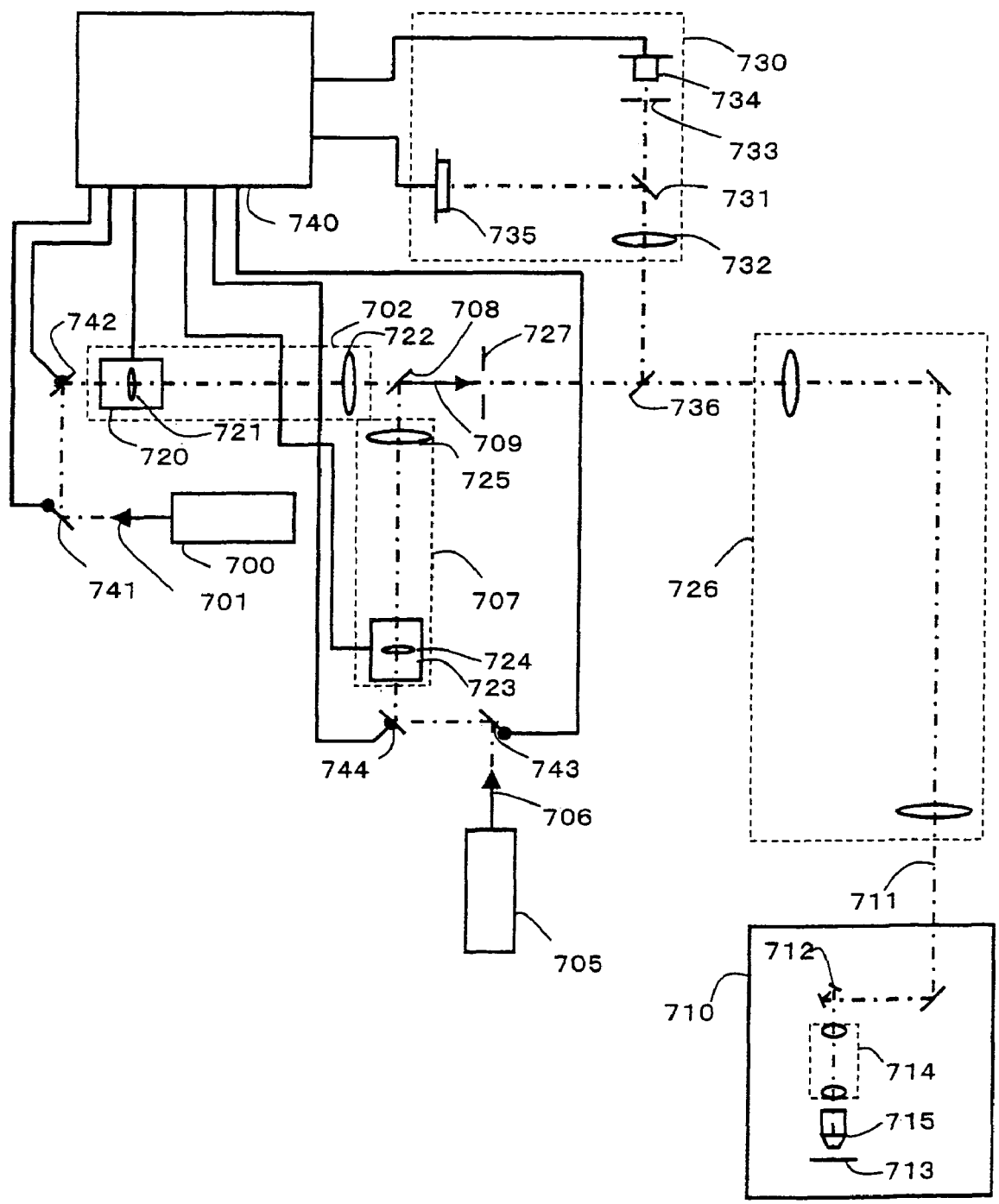
FIG. 7 is a view explaining the structure of a dual-wavelength excitation laser microscope of Embodiment 3 in the present invention.

The dual-wavelength excitation laser microscope of Embodiment 3 according to the present invention, as shown in FIG. 7, comprises a first laser light source 700 for emitting first laser light 701, a first beam expander 702 for adjusting the beam diameter and the angle of divergence of the first laser light 701, a second laser light source 705 for emitting second laser light 706, a second beam expander 707 for adjusting the beam diameter and the angle of divergence of the second laser light 706, a beam combiner 708 for combining the first laser light 701 and the second laser light 706 as a synthetic beam 709, an optical axis aligning detector 730 used for the optical axis alignment of the first laser light 701 and the second laser light 706, a microscope body 710, a first pupil projection optical system 726 for introducing the synthetic beam 709 into the microscope body 710, and a controller 740 electrically connected with detectors and movable parts to make the control of the optical axis alignment.

The microscope body 710 includes an objective lens 715 for magnifying and projecting a specimen 713, a proximity galvanomirror 712 for scanning the specimen 713 with the synthetic beam 709, a second pupil projection optical system 714 for making the entrance pupil of the objective lens 715 conjugate with the galvanomirror 712, and a light-detecting optical system, not shown, for detecting radiation produced by the specimen 713.

The first pupil projection optical system 726 constitutes an afocal optical system composed of two convex lenses along an optical axis 711 of the microscope body 710 to make a pupil stop 727 located on the optical path behind the beam combiner conjugate with the center position of the galvanomirror 712 and the entrance pupil of the objective lens 715 in the microscope body 710.

The first beam expander 702 is such that a first movable convex lens 721 placed on a first movable stage 720 and a first fixed convex lens 722 are arranged as an afocal system. In the first beam expander 702, the first movable stage 720 is driven along the optical axis, and thereby a distance between the first movable convex lens 721 and the first fixed convex lens 722 can be changed to alter the angle of divergence of the first laser light 701 emerging from the first beam expander 702. As such, the focus position of a confocal image formed by the first laser light 701 can be adjusted.

On the first movable stage 720, a pinhole of proper diameter is introduced at the back focus position of the first movable convex lens 721, and thereby it is also possible to make the first beam expander 702 function as a spatial filter.

The back focus position of the first beam expander 702 coincides with the pupil stop 727 and a first gimbaled movable mirror 742 is located at the front focus position conjugate with it. A first kinematic movable mirror 741 for introducing the first laser light 701 to the first gimbaled movable mirror 742 is located on the optical path between the first gimbaled movable mirror 742 and the first laser light source 700. By adjusting the inclination of the first kinematic movable mirror 741, the position of the optical axis of the first laser light 701 at the pupil stop 727 can be adjusted. In addition, since the first gimbaled movable mirror 742 and the pupil stop 727 have a conjugate relation, the inclination of the first gimbaled movable mirror 742 is adjusted and thereby the focusing position of the first laser light 701 on the specimen 713 can be adjusted without changing the position of the optical axis of the first laser light 701 at the pupil stop 727.

A second beam expander 707 is the same as the first beam expander 702 and thus its explanation is omitted.

In the optical axis aligning detector 730, a part of the synthetic beam 709 is reflected by a beam sampler 736 and taken out, and an optical axis position detecting system by functions of a confocal lens 732, a beam splitter 731, and a light-position sensor 735 and a focus position detecting system by functions of the confocal lens 732, a confocal pinhole 733, and a photodiode 734 are used to carry out the optical axis alignment and the focus position adjustment.

In the optical axis position detecting system, since the light-position sensor 735 is located at the position conjugate with the pupil stop 727 by the confocal lens 732, the center position of the synthetic beam 709 at the pupil stop 727 can be detected and the position of the optical axis of the synthetic beam 709 at the galvanomirror 712 or at the entrance pupil of the objective lens 715 that has the conjugate relation with the pupil stop 727 can also be detected. Hence, the position of incidence of the first laser light 701 on the entrance pupil of the objective lens 715 and the position of the optical axis of the second laser light 706 at the entrance pupil of the objective lens 715 can be optimally adjusted.

In the focus position detecting system, the confocal pinhole 733 located at the back focus position of the confocal lens 732 has the conjugate relation with the specimen 713, and by maximizing the amount of light transmitted through it, the first laser light 701 and the second laser light 706 can be focused at the same point.

The controller 740 is electrically connected with the optical axis position detecting system and the focus position detecting system in the optical axis aligning detector 730, and on the basis of output signals from them, the first kinematic movable mirror 741, the second kinematic movable mirror 743, the first gimbaled movable mirror 742, the second gimbaled movable mirror 744, the first movable stage 720, and the second movable stage 723, electrically connected, are driven and thereby the optical axis alignment and the focus position adjustment are automatically performed.

According to Embodiment 3 of the present invention, as mentioned above, the controller 740 is capable of automatically performing the optical axis alignment and the focus position adjustment and hence a dynamic shift between the optical axes of two laser beams of light caused by a change with the passage of time or a change of an oscillation condition can be corrected at real time.

Embodiment 4

The laser flow cytometer of Embodiment 4 according to the present invention will be explained below.

Figure 8A:
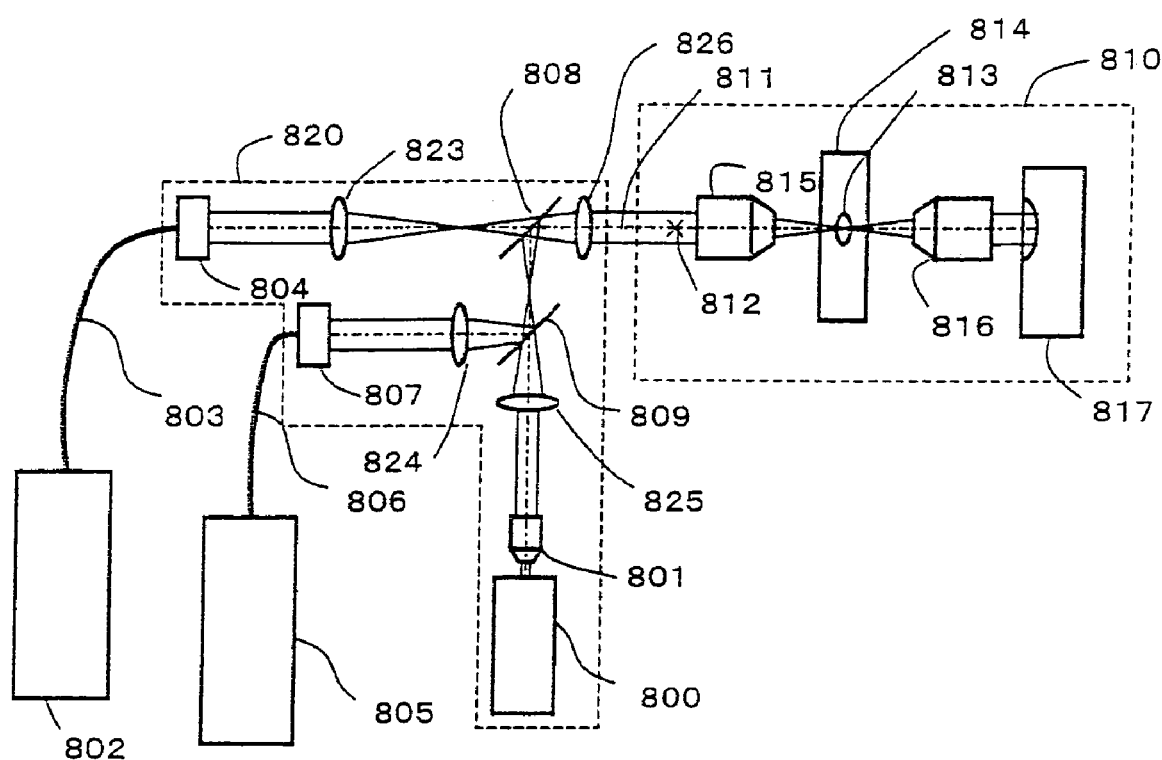
FIG. 8a is a view explaining the structure of a laser flow cytometer of Embodiment 4 in the present invention.

The laser flow cytometer of Embodiment 4 according to the present invention, as shown in FIG. 8a, comprises a measuring section body 810 and an external laser light introducing device 820. The measuring section body 810 includes a condenser lens 815 for condensing laser light on a cell 813 flowing through a microcapillary 814, a light-receiving lens 816 for receiving the laser light transmitted through the cell 813, and an image sensor 817. The external laser light introducing device 820 includes an internal laser light source 800; a beam expander 801 for changing the diameter of an emitted beam from the internal laser light source 800; a first laser light collimator 804 for collimating an emitted beam from a first external laser light source 802 connected to a first optical fiber 803; a second laser light collimator 807 for collimating an emitted beam from a second external laser light source 805 connected to a second optical fiber 806; a first beam combiner 808 and a second beam combiner 809 for introducing emitted beams from the internal laser light source 800, the first external laser light source 802, and the second external laser light source 805 into the same optical path; and first to fourth convex lenses 823, 824, 825, and 826 for projecting an entrance pupil 812 of the condenser lens 815 of the measuring section body 810 in the vicinities of the front focus positions of the first and second laser light collimators 804 and 807 and the beam expander 801.

Figure 8B:
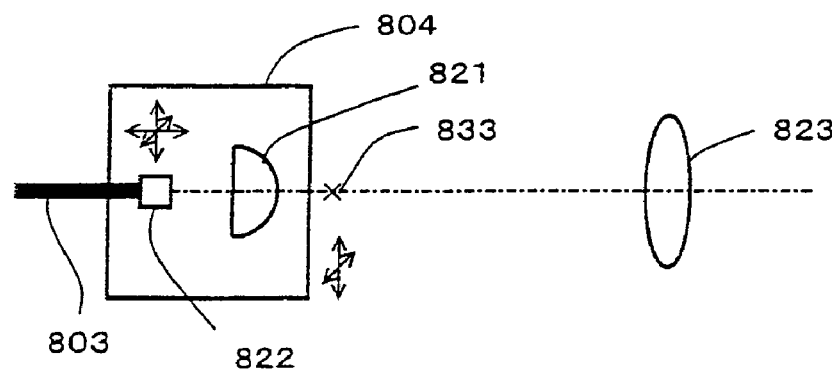
FIG. 8b is a view explaining the structure of the laser flow cytometer, in the proximity of a first laser light collimator, of Embodiment 4 of the present invention.

The first laser light collimator 804, as shown in FIG. 8b, is constructed to retain a first optical fiber exit port 822 provided at the tip of the first optical fiber 803 and a first collimating lens 821. With respect to an external pupil 833 projected at the front focus position of the first convex lens 823, the whole is shifted in a direction perpendicular to the optical axis, and thereby the adjustment of the position of incidence of the laser light at the external pupil 833 can be made. Moreover, the first optical fiber exit port 822 can be shifted in three directions with respect to the first collimating lens so that the adjustments of the angle of incidence and the wavefront curvature of the laser light at the external pupil 833 become possible. The same holds for the case of the second laser light collimator 807.

The way of adjusting the optical axis of the laser flow cytometer in this embodiment will be described with reference to the emitted beam from the first external laser light source 802. The whole of the first laser light collimator 804 is moved in the direction perpendicular to the optical axis and thereby the optical axis position adjustment of the emitted beam from the first external laser light source 802 is carried out, while the first optical fiber exit port 822 is moved in the direction perpendicular to the optical axis and thereby the optical axis angle adjustment of the emitted beam from the first laser light source 802 is performed. After that, the first optical fiber exit port 822 is moved in the direction horizontal to the optical axis and thereby the light-collecting position in the microcapillary 814 is made to coincide with that of the emitted beam from the internal laser light source 800. The same holds for the case of the emitted beam from the second external laser light source 805.

According to Embodiment 4 of the present invention, as mentioned above, the adjustment of the emitted beam from the external laser light source can be made very simply and rapidly. Furthermore, in this embodiment, even when the external laser is switched, the adjustment of the emitted beam can be performed simply and rapidly. In the embodiment, when the laser light collimator is provided for the exclusive use of each of the external lasers and various adjustments are previously completed, the external laser is switched through only the replacement of the laser light collimator. This dispenses with readjustment.

In this specification, the following features of the present invention are described.

1. In the external laser light introducing device, laser light is introduced from outside of an optical apparatus into inside and the laser light is condensed on a target by a condenser lens located inside the optical apparatus. In this case, the external laser light introducing device comprises a pupil projection optical system for projecting the entrance pupil of the condenser lens on an external pupil located outside the optical apparatus and an optical axis aligning mechanism for practically aligning the optical axis of the laser light with that of the external pupil.

2. In the external laser light introducing device of item 1, the optical axis aligning mechanism includes an optical axis position adjusting mechanism for making the position of the optical axis of the laser light practically coincide with the center of the external pupil and an optical axis angle adjusting mechanism for making the optical axis of the external pupil practically coincide with the angle of the optical axis of the laser light after the position of the optical axis of the laser light is made to practically coincide with the center of the external pupil by the optical axis position adjusting mechanism.

3. The external laser light introducing device of item 1 or 2 further comprises a wavefront curvature adjusting mechanism for adjusting the wavefront curvature of the laser light at the position of the external pupil.

4. The external laser light introducing device of any one of items 1-3 further comprises a plurality of optical axis aligning mechanisms for aligning optical axes of a plurality of beams of laser light with the optical axis of the external pupil and a beam combiner for combining the plurality of beams of laser light to introduce the laser light into the entrance pupil.

5. The external laser light introducing device of any one of items 1-4 further comprises a plurality of wavefront curvature adjusting mechanisms for adjusting wavefront curvatures of a plurality of beams of laser light at the external pupil.

6. The external laser light introducing device of any one of items 1-5 further comprises an optical axis position detector for detecting the position of incidence of the laser light at the external pupil.

7. The external laser light introducing device of item 6 further comprises an optical axis position feedback device driving the optical axis position adjusting mechanism by using an output from the optical axis position detector.

8. The external laser light introducing device of any one of items 1-7 further comprises an optical axis angle detector for detecting the angle of incidence of the laser light at the external pupil.

9. The external laser light introducing device of item 8 further comprises an optical axis angle feedback device driving the optical axis angle adjusting mechanism by using an output from the optical axis angle detector.

10. In the external laser light introducing device, laser light is introduced from outside of an optical apparatus into inside so that the laser light is condensed on a target by a condenser lens located inside the optical apparatus. In this case, the external laser light introducing device comprises a pupil projection optical system for projecting the entrance pupil of the condenser lens on an external pupil located outside the optical apparatus and a wavefront curvature adjusting mechanism for adjusting the wavefront curvature of the laser light at the position of the external pupil.

What is claimed is:

1. An external laser light introducing device for introducing laser light through a beam expander comprising a movable lens from outside of an optical apparatus into inside the optical apparatus through a galvanomirror located inside the optical apparatus so that the laser light is condensed on a target by a condenser lens located inside the optical apparatus, wherein the external laser light introducing device comprises:
   a pupil projection optical system consisting of a pair of fixed lenses for projecting an external pupil of the beam expander on the galvanomirror; and
   an optical axis aligning mechanism for aligning an axis of a beam of the laser light with an optical axis of the external pupil,
   wherein the external pupil is located where the position and/or a diameter of the beam of the laser light is unchanged by the optical axis alignment mechanism.

2. The external laser light introducing device according to claim 1, wherein the optical axis aligning mechanism includes:
   an optical axis position adjusting mechanism for making a position of the axis of the beam of the laser light practically coincide with a center of the external pupil; and
   an optical axis angle adjusting mechanism for making an angle of the optical axis of the external pupil practically coincide with any angle of the axis of the beam of the laser light after the position of the axis of the beam of the laser light is made to practically coincide with the center of the external pupil by the optical axis position adjusting mechanism.

3. The external laser light introducing device according to claim 1, further comprising wavefront curvature adjusting mechanism for adjusting a wavefront curvature of the beam of the laser light at the external pupil.

4. An external laser light introducing device for introducing a plurality of beams of laser light through a beam expander comprising a movable lens from outside of an optical apparatus into inside the optical apparatus through a galvanomirror located inside the optical apparatus, such that the laser light is condensed on a target by a condenser lens located inside the optical apparatus, wherein the external laser light introducing device comprises;
   a pupil projection optical system consisting of a pair of fixed lenses for projecting an entrance pupil of the condenser lens on an external pupil located outside the optical apparatus;
   a plurality of optical axis aligning mechanisms for aligning axes of the plurality of beams of laser light, respectively, with an optical axis of the external pupil, the external pupil being located where at least one of a position and a diameter of each of the beams of laser light is unchanged by the optical axis alignment mechanisms; and
   a plurality of wavefront curvature adjusting mechanisms for adjusting wavefront curvatures of the plurality of beams of laser light at the external pupil, respectively, the external pupil being located where at least one of a position and a diameter of each of the beams of laser light is unchanged by the wavefront curvature adjusting mechanisms.

5. The external laser light introducing device according to claim 1, further comprising an optical axis position detector for detecting a position of incidence of the laser light at the external pupil.

6. The external laser light introducing device according to claim 5, wherein the optical axis aligning mechanism includes an optical axis position adjusting mechanism for making a position of the axis of the beam of the laser light practically coincide with a center of the external pupil, and the external laser light introducing device further comprises an optical axis position feedback device that drives the optical axis position adjusting mechanism by using an output from the optical axis position detector.

7. The external laser light introducing device according to claim 1, further comprising an optical axis angle detector for detecting an angle of incidence of the laser light at the external pupil.

8. The external laser light introducing device according to claim 7, wherein the optical axis aligning mechanism includes an optical axis angle adjusting mechanism for making an angle of the optical axis of the external pupil practically coincide with an angle of the axis of the beam of the laser light, and the external laser light introducing device further comprises an optical axis angle feedback device that drives the optical axis angle adjusting mechanism by using an output from the optical axis angle detector.

9. An external laser light introducing device for introducing laser light through a beam expander comprising a movable lens from outside of an optical apparatus into inside the optical apparatus through a galvanomirror located inside the optical apparatus, such that the laser light is condensed on a target by a condenser lens located inside the optical apparatus, wherein the external laser light introducing device comprises:

a pupil projection optical system consisting of a pair of fixed lenses for projecting an external pupil of the beam expander on the galvanomirror; and a wavefront curvature adjusting mechanism for adjusting wavefront curvature of a beam of the laser light at the external pupil, the external pupil being located where at least one of a position and a diameter of the beam of the laser light is unchanged by the wavefront curvature adjusting mechanism.

10. A method of introducing external laser light through a beam expander comprising a movable lens from outside of an optical apparatus into inside the optical apparatus through a galvanomirror located inside the optical apparatus, such that the laser light is condensed on a target by a condenser lens located inside the optical apparatus, wherein the method comprises:

projecting an entrance pupil of the condenser lens via a pair of fixed lenses on an external pupil located outside the optical apparatus; and adjusting a wavefront curvature of a beam of the laser light at the external pupil using wavefront curvature adjusting mechanism, the external pupil being located where at least one of a position and a diameter of the beam of the laser light is unchanged by the wavefront curvature adjusting mechanism.

11. A laser microscope apparatus comprising:

a laser light source section emitting laser light;

a microscope body including an objective lens for magnifying and observing a specimen; and an external laser light introducing device for introducing the laser light into the microscope body through a beam expander comprising a movable lens;

wherein the external laser light introducing device includes a pupil projection optical system consisting of a pair of fixed lenses for projecting an entrance pupil of the objective lens on an external pupil of the microscope body and a wavefront curvature adjusting mechanism for adjusting a wavefront curvature of a beam of the laser light at the external pupil, the external pupil being located where at least one of a position and a diameter of the beam of the laser light is unchanged by the wavefront curvature adjusting mechanism.

12. The external laser light introducing device according to claim 1, further comprising:

at least one another optical axis aligning mechanism so that the external laser light introducing device has a plurality of optical axis aligning mechanisms for practically aligning axes of a plurality of beams of the laser light, respectively, with the optical axis of the external pupil; and a beam combiner for combining the plurality of beams of the laser light to introduce the laser light as combined into the entrance pupil.

* * * * *